United States Patent
Abrahams et al.

(10) Patent No.: US 10,277,377 B2
(45) Date of Patent: Apr. 30, 2019

(54) DYNAMIC QUALITY OF SERVICE ADJUSTMENT USING DEVICE-SIDE ANALYTICS

(71) Applicant: International Business Machines Corporation, Armonk, NY (US)

(72) Inventors: Faried Abrahams, Laytonsville, MD (US); Sasikanth Eda, Andhra pradesh (IN); Sivakumar Gandhi, Victoria (AU); Sandeep R. Patil, Pune (IN); Piyush Sarwal, Leawood, KS (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 821 days.

(21) Appl. No.: 14/480,738

(22) Filed: Sep. 9, 2014

(65) Prior Publication Data

US 2016/0073413 A1  Mar. 10, 2016

(51) Int. Cl.
H04L 5/00  (2006.01)
H04W 72/08  (2009.01)
H04W 72/10  (2009.01)

(52) U.S. Cl.
CPC .......... H04L 5/006 (2013.01); H04W 72/087 (2013.01); H04W 72/10 (2013.01)

(58) Field of Classification Search
CPC .... H04L 5/006; H04W 72/08; H04W 72/087; H04W 72/10
See application file for complete search history.

(56) References Cited

U.S. PATENT DOCUMENTS 8,589,541 B2  11/2013 Raleigh
2006/0047829 A1  3/2006 Acharya et al.
(Continued)

FOREIGN PATENT DOCUMENTS

CA  2318438 A1  7/1999
EP  2446695 A1  5/2012
(Continued)

OTHER PUBLICATIONS

Motorola Inc. et al; QoS treatment for devices behind 4G Wireless Hotspot, Dec. 3, 2013.
2011/0235542
A1
*
9/2011
Li ................................................................. H04L 1/20
370/252
(Continued)

*Primary Examiner* — Mandish K Randhawa
(74) *Attorney, Agent, or Firm* — Garg Law Firm, PLLC; Christopher K. McLane (57) ABSTRACT

A first quality of service (QoS) desired for a first application during a period over a wireless network is determined. From a plurality of data communication channels, a data communication channel presently assigned to a first type of data packets is identified, the first type of data packets being used by the first application. A determination is made that the presently assigned data communication channel is unsuitable to provide the first QoS. A ranking of the first type of data packets is adjusted relative to a second type of data packets to assign a new rank to the first type of data packets. The new rank is transmitted to a service provider system associated with the wireless network, the new rank causing the service provider system to assign the first type of data packets to a second data communication channel in the plurality of data communication channels.

18 Claims, 5 Drawing Sheets

(56) References Cited

U.S. PATENT DOCUMENTS

| | | | |
|---|---|---|---|
| 2011/0249125 A1* | 10/2011 | Wallack | A61B 8/565 348/163 |
| 2012/0324092 A1 | 12/2012 | Brown et al. | |
| 2013/0031279 A1* | 1/2013 | Venugopal | H04L 12/1435 710/18 |
| 2013/0044603 A1 | 2/2013 | Macias et al. | |
| 2014/0080415 A1 | 3/2014 | Black et al. | |
| 2014/0126406 A1* | 5/2014 | Ibanez | H04L 41/5025 370/252 |
| 2015/0074716 A1* | 3/2015 | Redmann | G06Q 30/0251 725/34 |
| 2015/0092673 A1* | 4/2015 | Singh | H04W 28/0215 370/329 |
| 2016/0112896 A1* | 4/2016 | Karampatsis | H04W 28/0252 370/230.1 |
| 2016/0227471 A1* | 8/2016 | De Foy | H04W 4/001 |

FOREIGN PATENT DOCUMENTS

| | | |
|---|---|---|
| WO | 2007129199 A2 | 11/2007 |
| WO | 2008046643 A1 | 4/2008 |
| WO | 2013007287 A1 | 1/2013 |

OTHER PUBLICATIONS

Siemans, AG. et al; Utilization of Hierarchical Layered Media (Video) Encoding for Quality of Service Classification, Aug. 24, 2006.

Gemici, OF. et al; Trade-off analysis of QoS-aware configurable LTE downlink schedulers, 2013.

Mohan, S. et al; Mobile network-aware social computing applications: a framework, architecture and analysis, 2013.

3GPP Long Term Evolution (LTE), http://4g-lte-world.blogspot.in/, May 19, 2014.

* cited by examiner

DYNAMIC QUALITY OF SERVICE ADJUSTMENT USING DEVICE-SIDE ANALYTICS

TECHNICAL FIELD

The present invention relates generally to a method, system, and computer program product for improving the quality of service (QoS) in mobile communications. More particularly, the present invention relates to a method, system, and computer program product for dynamic quality of service adjustment using device-side analytics.

BACKGROUND

Wireless communications (mobile communications) enable users to perform a variety of tasks using their mobile devices. An ever increasing number of applications is available for the wireless data processing systems, wireless data communication devices, or wireless computing platforms (collectively and interchangeably, "mobile device" or "mobile devices"). For example, many mobile devices not only allow the users to make voice calls, but also exchange emails and messages, access remote data processing systems, and perform web-based interactions and transactions.

Many types of wireless protocols enable mobile communications on the mobile devices. For example, wireless standards such as Fourth Generation (4G) Long Term Evolution (LTE) allow data communication as well as voice communication on mobile devices. 4G LTE and other evolving cellular connectivity standards are primarily focused on shift the wireless networks from being hybrid voice and data networks to high speed data-only networks. The data is carried as Internet Protocol (IP) data traffic in packets. Some standards, such as 4G, are transforming the voice communication to IP traffic as well, and other evolving standards are likely to follow this direction.

IP data packets can carry just about any kind of data to and from a mobile device. For example, some packets can carry video data for a video playback application executing on the mobile device, some other packets can carry alphanumeric or textual data for a document processing application executing on the mobile device, and some other packets can carry image data for a image processing application executing on the mobile device. Many types of data can similarly be carried in the data packets to and from the mobile devices.

SUMMARY

The illustrative embodiments provide a method, system, and computer program product for dynamic quality of service adjustment using device-side analytics. An embodiment includes a method for dynamic quality of service (QoS) adjustment using device-side analytics. The embodiment determines, using a processor on a mobile device, a first QoS desired for a first application during a period over a wireless network. The embodiment identifies, from a plurality of data communication channels, a data communication channel presently assigned to a first type of data packets, the first type of data packets being used by the first application. The embodiment determines that the presently assigned data communication channel is unsuitable to provide the first QoS. The embodiment adjusts a ranking of the first type of data packets relative to a second type of data packets to assign a new rank to the first type of data packets. The embodiment transmits the new rank to a service provider system associated with the wireless network, the new rank causing the service provider system to assign the first type of data packets to a second data communication channel in the plurality of data communication channels.

Another embodiment includes a computer program product for dynamic quality of service (QoS) adjustment using device-side analytics. The embodiment further includes one or more computer-readable tangible storage devices. The embodiment further includes program instructions, stored on at least one of the one or more storage devices, to determine, using a processor on a mobile device, a first QoS desired for a first application during a period over a wireless network. The embodiment further includes program instructions, stored on at least one of the one or more storage devices, to identify, from a plurality of data communication channels, a data communication channel presently assigned to a first type of data packets, the first type of data packets being used by the first application. The embodiment further includes program instructions, stored on at least one of the one or more storage devices, to determine that the presently assigned data communication channel is unsuitable to provide the first QoS. The embodiment further includes program instructions, stored on at least one of the one or more storage devices, to adjust a ranking of the first type of data packets relative to a second type of data packets to assign a new rank to the first type of data packets. The embodiment further includes program instructions, stored on at least one of the one or more storage devices, to transmit the new rank to a service provider system associated with the wireless network, the new rank causing the service provider system to assign the first type of data packets to a second data communication channel in the plurality of data communication channels.

Another embodiment includes a computer system for dynamic quality of service (QoS) adjustment using device-side analytics. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to determine, using a processor on a mobile device, a first QoS desired for a first application during a period over a wireless network. The embodiment further includes program instructions, stored on at least one of the one or more storage devices for execution by at least one of the one or more processors via at least one of the one or more memories, to identify, from a plurality of data communication channels, a data communication channel presently assigned to a first type of data packets, the first type of data packets being used by the first application. The embodiment further includes program instructions, stored on at least one of the one or more storage devices for execution by at least one of the one or more processors via at least one of the one or more memories, to determine that the presently assigned data communication channel is unsuitable to provide the first QoS. The embodiment further includes program instructions, stored on at least one of the one or more storage devices for execution by at least one of the one or more processors via at least one of the one or more memories, to adjust a ranking of the first type of data packets relative to a second type of data packets to assign a new rank to the first type of data packets. The embodiment further includes program instructions, stored on at least one of the one or more storage devices for execution by at least one of the one or more processors via at least one of the one or more memories, to transmit the new rank to a service provider system associated with the wireless network, the new rank causing the service provider system to assign the first type of data packets to a second data communication channel in the plurality of data communication channels.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A mobile device communicates with other data processing system by using the wireless data communication services provided by a service provider. For example, a mobile carrier such as AT&T® provides a subscriber's mobile device access to the Internet, other data networks, and other data processing systems over their 4G and 4G LTE wireless networks (AT&T is a trademark of AT&T Corp. in the United States and in other countries.)

Typically, one or more systems of a service provider come into play when providing wireless data communication services to a mobile device. A mobile device is also known as a user equipment (UE). For example, Evolved Node B (eNB) is a system or element in LTE infrastructure and comprises components such as a base station transceiver that communicate directly with a UE. A UE registers to an eNB before data communications from the UE can use the wireless network. The process of a UE registering with an eNB is also known as "attaching" (other forms "attaches", and "attach").

A Mobile Management Entity (MME) is a control node or a system that is responsible for paging and tagging procedure including retransmissions to a UE. The MME also activates and deactivates one or more data communication channels with the UE when the UE attaches.

A data communication channel is called a bearer or a bearer channel. When a UE attaches, the MME assigns a default bearer channel to the UE over which the data communication to and from the UE can occur using the service provider's wireless network. Additional data channels can be assigned to the UE depending on the data traffic load and other considerations. Such other data channels are called dedicated bearer channels. Presently, the default bearer channel does not guarantee any specific bit rate for the data transmissions occurring thereon. In contrast, the dedicated bearer channel does guarantee a specific bit rate for the data transmissions occurring using that channel.

The MME is also responsible for choosing the serving gateway (SGW) or packet data network gateway (PDNW or PGW) (collectively and interchangeably referred to herein as, SGW/PGW) for a UE when the UE attaches. The SGW/PGW provides the data communications services over the default and dedicated bearer channels.

A default bearer channel has an IP address that also identifies the UE that is using the default bearer channel. A dedicated bearer channel does not have a separate IP address, but shares the IP address of the default bearer channel.

The default bearer channel is often used for providing continuity of primary or essential services (primary service or primary services) to the UE, such as voice communications in case of mobile phones. Accordingly, the default bearer channel is presently configured to carry the data packets of the primary services and in some cases data packets of other types. To improve the user experience and provide higher bit rates than default bearer channel, a service provider often uses a dedicated bearer channel to carry other types of data traffic to and from the UE. For example, while the default bearer channel may carry the voice packets and channel messaging packets between the UE and the service provider systems, the dedicated bearer channel may be configured to carry the video data packets, email and other messaging packets, and other types of data packets to other data networks and data processing systems.

The illustrative embodiments recognize that presently, determining which types of data traffic will be carried by the default bearer channel and which other types of data traffic will be carried by the dedicated bearer channel is a function that its performed within a service provider system. For example, the MME, the SGW/PGW, or a combination thereof, establishes the QoS criteria for the various types of data traffic to and from the UE.

The illustrative embodiments recognize that a service provider system collects pre-determined data, such as logs or preferences, from a UE. The service provider system determines from the pre-determined data the types of data traffic and their corresponding QoS index. The higher the QoS index the higher the QoS for that type of data traffic, and therefore for the corresponding data packets, and viceversa. The QoS index of a data traffic, and the available capacity on the default bearer channel and the dedicated bearer channel servicing the UE, determines which channel will carry that data traffic and its packets.

Certain types of data traffic, such as the data traffic pertaining to a primary service, are kept on the default bearer channel. Other data traffic may be services by the dedicated bearer channel or the default bearer channel according to their QoS and available capacity on the channels.

The illustrative embodiments recognize that such a manner of data traffic distribution over the channels is inefficient, inflexible, and often unsuitable for the way a particular UE is used. For example, assume that a user is using the user's UE on a 4G network. An service provider system has determined that a the data traffic of a real time service, such as for making video calls, are tunneled via dedicated bearer channel with a guaranteed bit rate, and other services such as web browsing and chat services are tunneled via default bearer channel at a non-guaranteed bit rate. However, further assume that the person has no interest in video calling and mostly uses the 4G network for chat services.

The illustrative embodiments recognize that in this scenario, even though the service provider has allocated a dedicated bearer channel to the UE, the dedicated bearer channel is not contributing in improving the user experience. The user continues to experience low speeds or poor quality on the chat services because that data traffic is carried on a non-guaranteed bit rate channel, even though the user's device is enabled for a high speed guaranteed bit rate channel.

The illustrative embodiments recognize that poor user experience has undesirable consequences. For example, the high latency or poor quality of chat communications might result in negative feedback for the service provider, or worse, the user switching to a different service provider.

As another example, assume the scenario where a single wireless connection is utilized by multiple users, for example user A uses the UE during a day shift and user B uses the UE during night shift. User A is a relatively heavy user of voice calls as compared to user B, and user B is a relatively heavy user of web browsing as compared to user A. User A's satisfaction would increase if voice call traffic was carried on a dedicated bearer channel, but user B's satisfaction would drop if web services were carried on the default bearer channel.

Presently used methods for determining such contradictory, conflicting, or simply different usages under different circumstances. If the previously described traffic placement is used, and the voice traffic is placed on the default bearer channel, and the web traffic not being a real time traffic is also placed on the default bearer channel, both users A and B are likely to be dissatisfied.

Thus, the illustrative embodiments recognize that the present methodology of statically determining a QoS index for the various types of data traffic of a UE by using periodically obtained pre-determined information from the UE is inefficient, inflexible, and not dynamically responsive to changing UE usage circumstances. The illustrative embodiments further recognize that the present methodology for data traffic placement also leads to poor user experience, poor customer retention, or both.

The illustrative embodiments used to describe the invention generally address and solve the above-described problems and other problems related to data traffic placement on various available channels, and the QoS of the affected services on a mobile device. The illustrative embodiments provide a method, system, and computer program product for dynamic quality of service adjustment using device-side analytics.

An embodiment is implemented as an application or another suitable form thereof, on a UE. Within the scope of the disclosure, a UE does not comprise a service provider system such as a MME or a SGW/PGW, and is not configured to operate as a router of data packets from one external system to another external system.

A user uses the UE for a variety of activities. The usage of the UE can change over time and depending on circumstances. The circumstances include, but are not limited to, different users using a common UE to perform different combination of activities, the same or different users performing the same or different combination of activities in different manners, and one or more users using the UE at different times in different manners. From this disclosure, those of ordinary skill in the art will be able to conceive many other circumstances where the usage of the UE changes, to wit, is dynamic, and the same are contemplated within the scope of the illustrative embodiments.

An embodiment monitors the usage of the UE. For example, one embodiment determines from a user's social media interactions that the user performs a certain amount of interactions or communications on social media using certain applications. As another example, another embodiment determines that the UE is used for downloading or synchronizing files between the UE and another data processing system at particular times of the day. As another example, another embodiment determines that the UE participates in voice calls for more than a threshold amount of time on certain days and times, and participates on video calls on certain other days and times.

These examples of usages of a UE, and the monitoring thereof are not intended to be limiting on the illustrative embodiments. Those of ordinary skill in the art will be able to conceive many other usages and combinations of usages of a UE from this disclosure and the same are contemplated within the scope of the illustrative embodiments.

Furthermore, the usage monitoring can be performed in any suitable manner. For example, one embodiment monitors the usage in real-time or near real-time as the usage is occurring. Another embodiment monitors the usage by examining one or more log files upon detecting certain events that correspond to the usage. Another embodiment performs the monitoring by examining a job queue or the scheduled processes in the UE based on an event trigger.

Generally, any manner of monitoring can be used in combination with any other manner of monitoring. Furthermore, the monitoring can be triggered by events, triggers, schedules, on-demand, periodically, or in other suitable manner. For example, an embodiment presents a user interface to the user, and the user uses the user interface to manually specify a manner of usage planned by the user for the UE, e.g., by specifying a application and expected times and durations of the application's usage.

From the monitoring data, an embodiment determines the usage preferences or usage patterns for the UE. Optionally, one embodiment may maintain one or more dynamic profiles to track the changing usages. The dynamic profiles maintained and updated by an embodiment are distinct from any profiles created and read by a service provider system.

Based on the determined usage preference or pattern, an embodiment determines a relative priorities of the various activities and their corresponding data communication needs. For example, in the above example, the embodiment that the data traffic of the applications used for communications on social media should have the highest QoS at certain times, the second highest QoS at certain other times, and lowest QoS at certain other times; file transfer data traffic should have the highest QoS on certain scheduled times, but should always have a QoS corresponding to a reliable high speed connectivity; and that the voice calls should have the highest QoS on certain days and times, video calls should have the highest QoS on certain other days and times, and voice calls and video calls should both always have available connectivity no matter how slow at other times.

In this manner, dynamically according to the changing usage under changing circumstances, an embodiment determines relative QoS indices of the various types of data traffic on the UE. The embodiment transmits the QoS indices or an equivalent thereof to a service provider system, such as to the MME or SGW/PGW, or both. For example, one embodiment transmits the QoS indices or QoS ranking to a service provider system when the embodiment determines that at least one QoS ranking has changed by more than a threshold amount of change. Another embodiment transmits the QoS indices or QoS ranking to a service provider system when the embodiment determines that at least one QoS ranking has changed, regardless of the amount of change.

Furthermore, more than one dedicated bearer channel can be available to a UE at any given time. Accordingly, the total number of default bearer channel and dedicated bearer channels, and the capacities thereon available to the UE can increase or decrease. An embodiment detects a change in the number or capacities of default bearer channel and dedicated bearer channels, recomputes the QoS ranking for the time of the change or for a future period, and transmits the recomputed QoS indices or QoS ranking to a service provider system.

The service provider system that receives the QoS ranking from an embodiment configures or tunnels the corresponding types of data traffic on a default bearer channel or a dedicated bearer channel accordingly. For example, even though the service provider system may have configured to carry the voice packets on the default bearer channel, the revised QoS ranking from an embodiment may indicate that the voice packets are to receive the highest QoS during a period. Accordingly, the service provider system reconfigures the voice call packets to be carried on a dedicated bearer channel available to the UE during that period instead of the default bearer channel.

A method of an embodiment described herein, when implemented to execute on a data processing system, comprises substantial advancement of the functionality of that data processing system in providing wireless services. For example, the illustrative embodiments enable the data processing system, e.g., a UE, to dynamically change, relative to another type of data traffic, the ranking of a type of data traffic that the user is either actually using or expected to use during a given period. Such manner of dynamically changing the priority or ranking of a type of data traffic, to correspondingly change a QoS of an associated application on the UE, is unavailable in presently available data processing systems for providing wireless network services. Thus, a substantial advancement of such data processing systems by executing a method of an embodiment comprises dynamic quality of service adjustment using device-side analytics without adding channels, bandwidth, or cost, thereby improving user experience with the UE, the application, and the service provider's wireless network services.

The illustrative embodiments are described with respect to certain standards, networks, services, applications, usages, patterns, preferences, priorities, rankings, QoS levels, channel provisioning, triggers, events, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
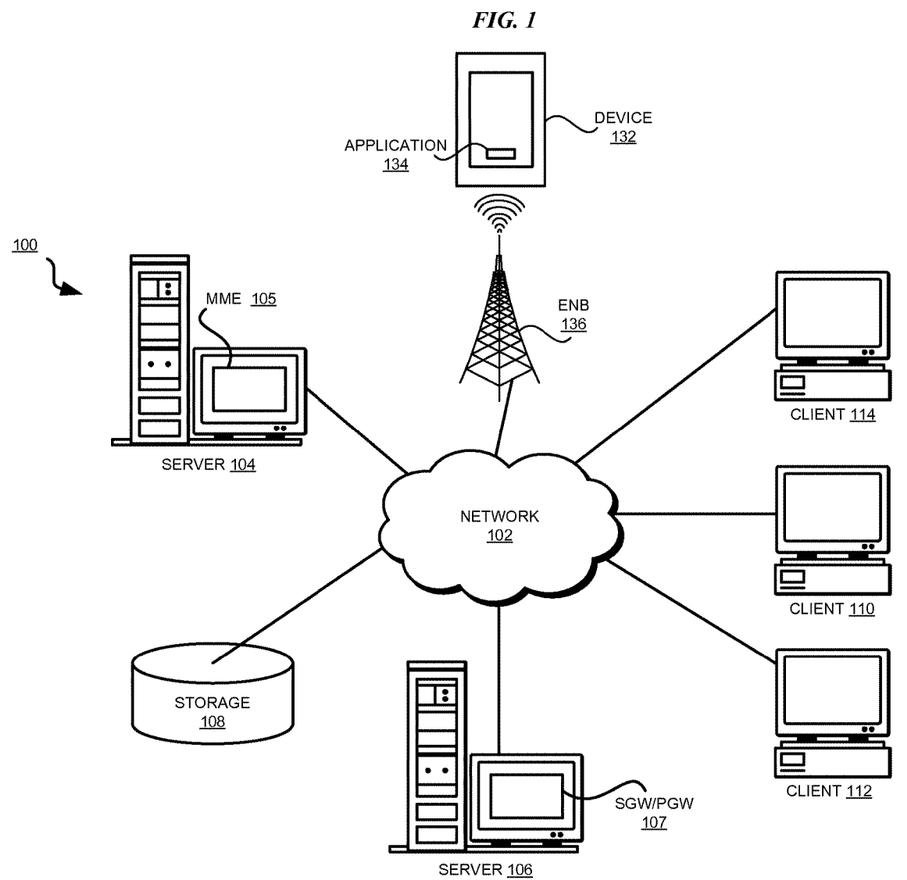
FIG. 1 depicts a block diagram of a network of data processing systems in which illustrative embodiments may be implemented.
Figure 2:
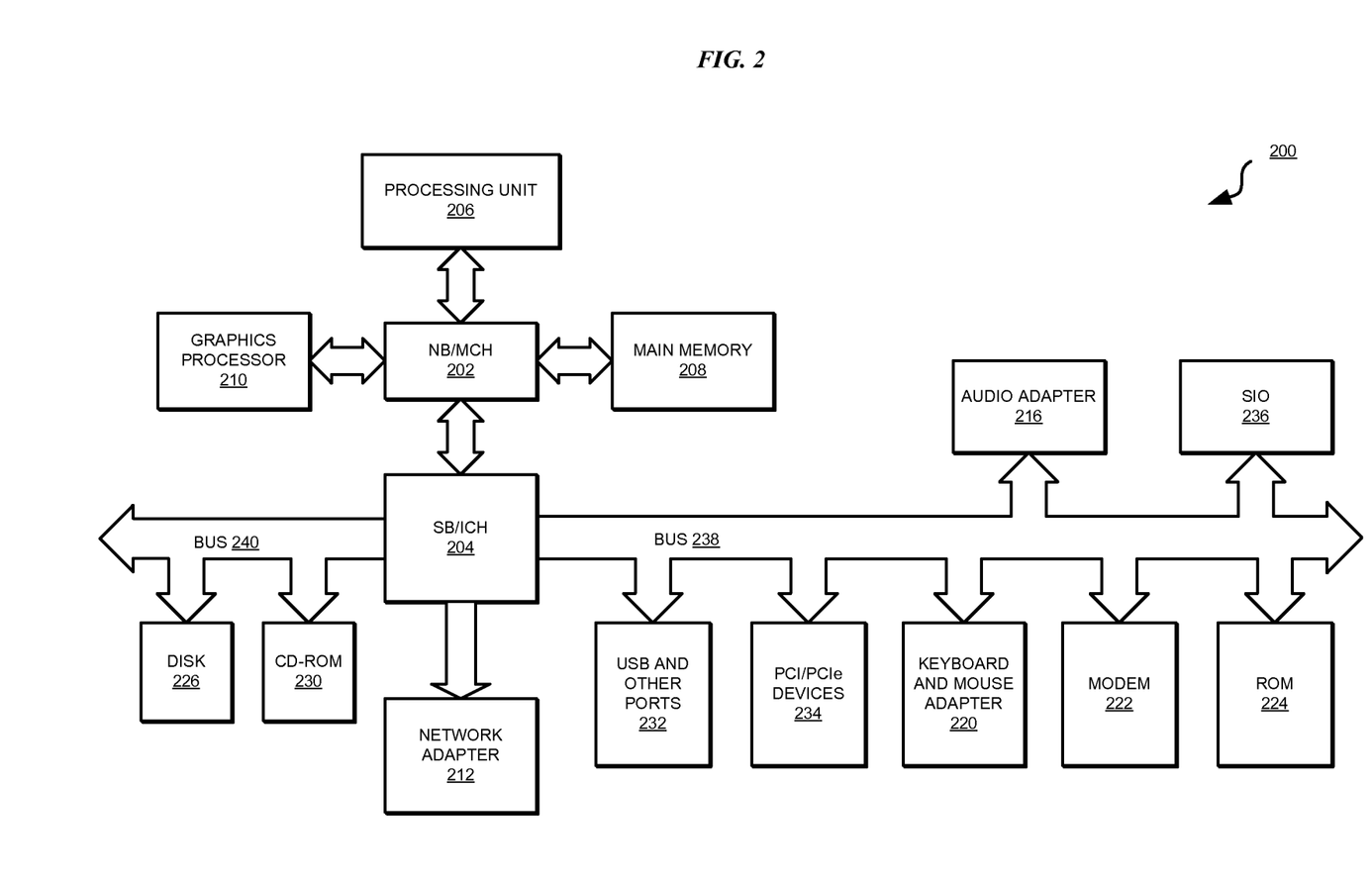
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is an example of a UE described herein. For example, device 132 can take the form of a smartphone, a tablet computer, a laptop computer, client 110, a wearable computing device, or any other suitable device that can be configured to use wireless network services. Application 134 implements an embodiment described herein. MME 105 is a service provider system and is usable with respect to device 132 and application 134 in the manner described herein. SGW/PGW 107 is another service provider system and is usable with respect to device 132 and application 134 as described herein. eNB 136 is another service provider system or component and is usable with respect to device 132 and application 134 as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134, MME 105, and SGW/PGW 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
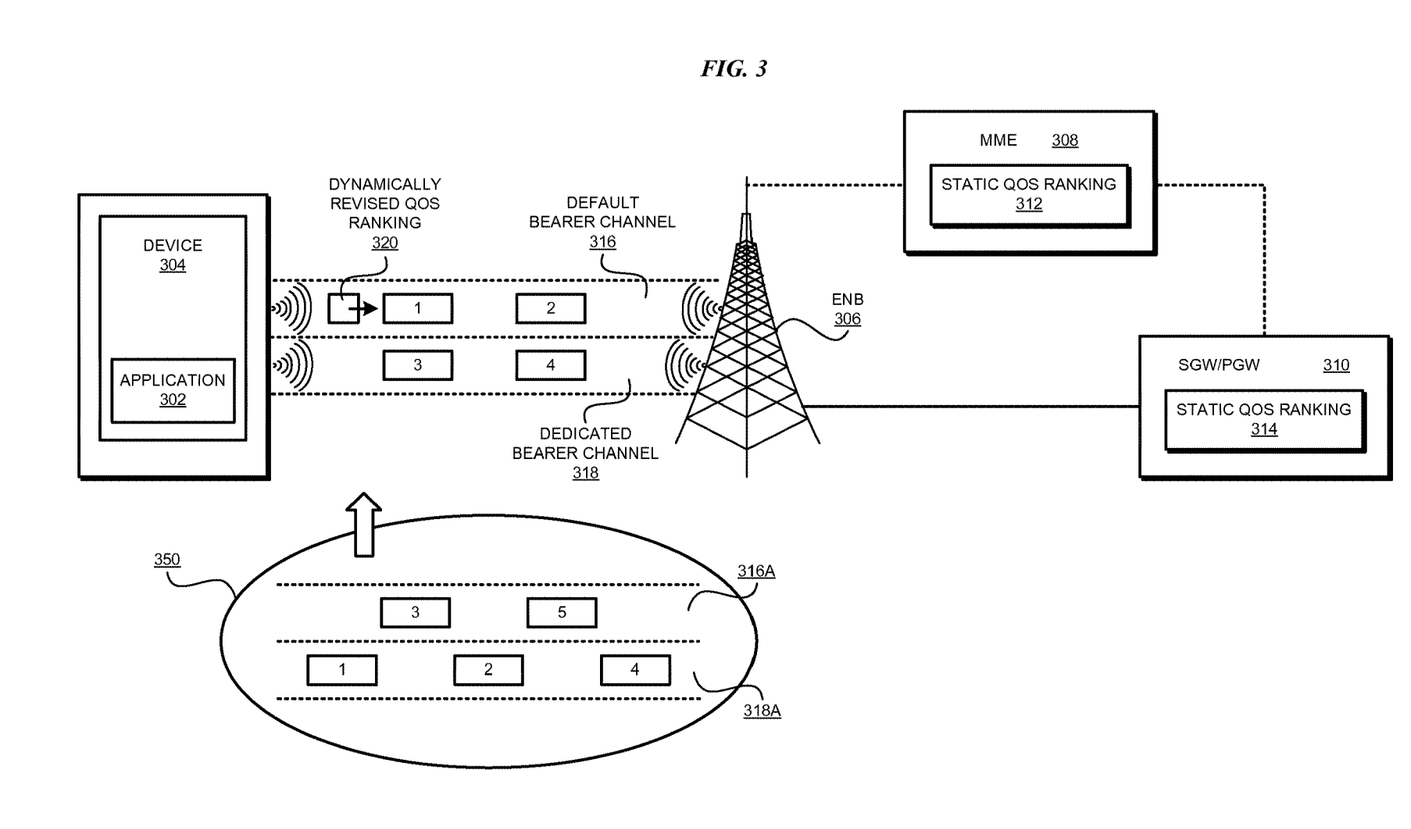
FIG. 3 depicts an example configuration for dynamic quality of service adjustment using device-side analytics in accordance with an illustrative embodiment.

With reference to FIG. 3, this figure depicts an example configuration for dynamic quality of service adjustment using device-side analytics in accordance with an illustrative embodiment. Application 302 is an example of application 134, device 304 is an example of device 132, eNB 306 is an example of eNB 136, MME 308 is an example of MME 105, and SGW/PGW 310 is an example of SGW/PGW 107, respectively, in FIG. 1.

MME 308, SGW/PGW 310, or both, maintain static QoS ranking 312, 314, or both, respectively. For the purposes of this figure, assume that MME 308 maintains static QoS raking 312. Further assume that static QoS ranking 312 is either an initial QoS ranking when default bearer channel 316 is provisioned for device 304, or a previous version of a dynamic QoS ranking previously supplied by application 302.

Default bearer channel 316 and dedicated bearer channel 318 are example channels that have been assigned to device 304 for wireless data communication with eNB 306. According to static QoS 312, data packets of types "1" and "2" are configured to be carried on default bearer channel 316 and data packets of types "3" and "4" are configured to be carried on dedicated bearer channel 318.

Application 302 implements an embodiment described herein. At some point in time, application 302 recomputes the QoS rankings of the various types of data traffic packets that are to be sent from or received at device 302. Application 302 determines that the packets of type "1", "2" and "4" should receive a guaranteed bit rate service during a given period. Application 302 further determines that the packets of type "3" can receive a non-guaranteed bit rate during the given period. Application 302 further determines that packets of a new packet type "5" should be assigned to default bearer channel 316 for another suitable reason during the given period.

For example, application 302 may make such a determination based on the information that packet types "1", "2" and "4" are associated with applications that a user will be executing on device 302 during that period, and a guaranteed bit rate for the transmission and receiving of the packets of type "1", "2" and "4" will improve the user's experience in using the corresponding applications on device 302. Application 302 may make the determination further based on the information that packet types 3" and "5" are associated with applications that a user will likely not be executing on device 302 during that period, and simply providing available connectivity on default bearer channel 316 will suffice for those applications during that period without adversely affecting the user experience.

According to these or other similarly purposed computations, application 302 creates dynamically revised QoS ranking 320, where the QoS index or ranks of packet types "1", "2", and "4" are higher than the QoS index or ranks of packet types "3" and "5". Application 302 transmits, or causes to be transmitted, dynamically revised QoS ranking 320 to a service provider system, e.g., MME 308.

Only as an example, and without implying any limitation thereto, dynamically revised QoS ranking 320 is shown as transmitting over default bearer channel 316. An implementation can adapt an embodiment to transmit dynamically revised QoS ranking 320 over dedicated bearer channel 318 without departing the scope of the illustrative embodiments. The receiving service provider system, e.g., MME 306, uses dynamically revised QoS ranking 320 during the period to reconfigure traffic on default bearer channel 316 and dedicated bearer channel 318.

Inset 350 depicts the revised data traffic flow during the period as a result of dynamically revised QoS ranking 320. Default bearer channel 316A is the state of default bearer channel 316 during the period, and is shown to carry packets of types "3" and "5". Dedicated bearer channel 318A is the state of dedicated bearer channel 318 during the period, and is shown to carry packets of types "1", "2", and "4".

Figure 4:
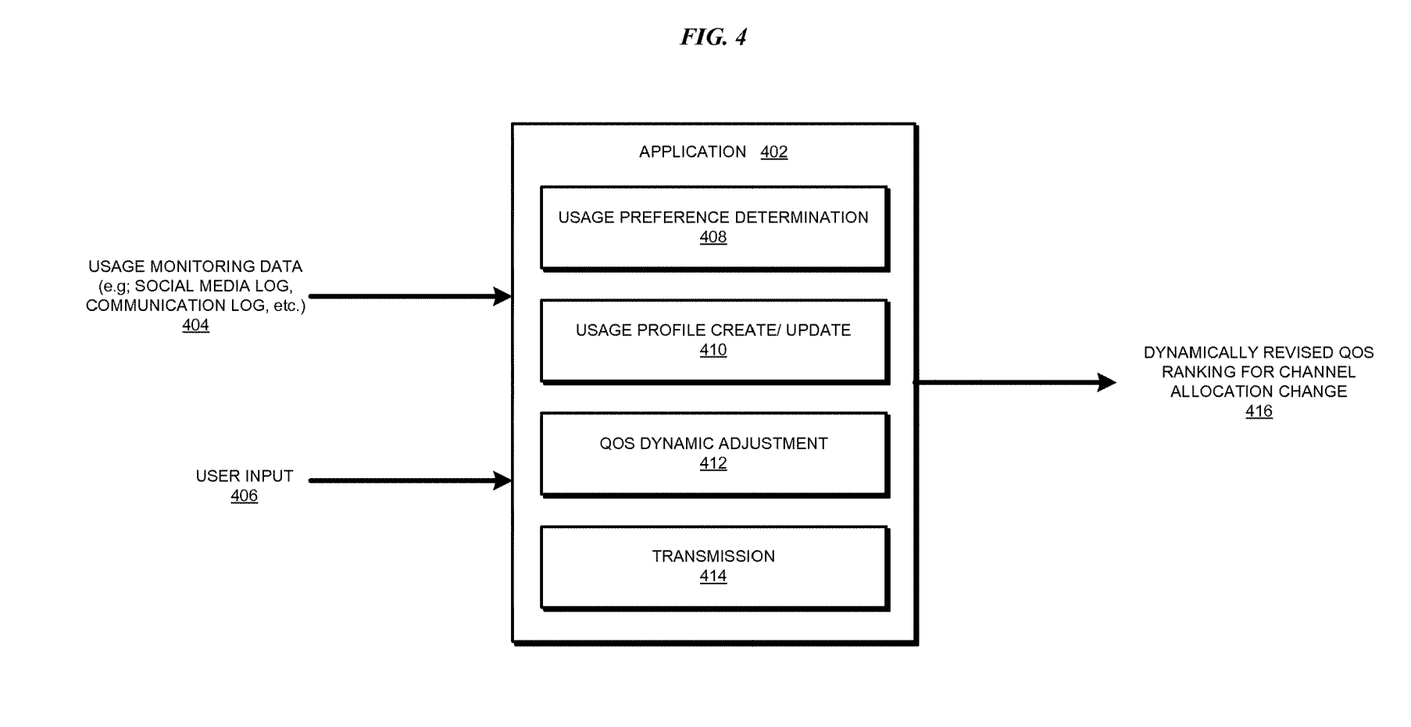
FIG. 4 depicts an example application to dynamically revise QoS rankings in accordance with an illustrative embodiment.

With reference to FIG. 4, this figure depicts an example application to dynamically revise QoS rankings in accordance with an illustrative embodiment. Application 402 is an example of application 302 in FIG. 3.

Application 402 receives as input usage monitoring data 404. Usage monitoring data 404 comprises any suitable type of data on a UE, e.g., device 304 in FIG. 4, that is indicative of a usage or a change in usage of data packets of a particular type, including but not limited to social media interaction logs, data communication log, processor or network adapter queue log, or other suitable sources of usage data.

Optionally, either solely or in addition to usage monitoring data 404, application 402 receives user input 406. A user provides user input 406 to manually indicate the user's usage preferences during a given time period.

Using input 404, input 406, or both, component 408 computes or determines which data packet types are going to be in use during the given period. Component 408 further determines the QoS level or ranking according to which the channel assignment of those types of packets should be configured for the period.

Component 410 optionally creates or updates one or more dynamic profiles. For example, if a QoS ranking repeats under certain usage circumstances, it is computationally advantageous to create a dynamic profile for that QoS ranking. If input 404 indicates the usage circumstances similar to the usage circumstances of the saved dynamic profile, the dynamic QoS ranking operation can be avoided and the QoS ranking corresponding to the saved dynamic profile can be transmitted as dynamically revised QoS ranking 320 in FIG. 3.

Operating in this manner, component 410 creates and manages one or more dynamic profiles. Component 410 compares the usage circumstances from input 404, 406, or both, and determines whether a new dynamic profile should be created, an existing dynamic profile should be updated, or a dynamic profile currently in used should be swapped with a different dynamic profile to cause a different dynamically revised QoS ranking to become effective for the period. Component 410 then performs the creating, updating, or swapping operation on the dynamic profile as needed.

Whether by using a dynamic profile from component 410, or by using a QoS computation from component 408, component 412 constructs a new QoS ranking or modifies a QoS ranking in use at the time. Transmission component 414 transmits the QoS ranking output from component 412 as dynamically revised QoS ranking 416 in the manner of dynamically revised QoS ranking 320 in FIG. 3. Dynamically revised QoS ranking 416 causes the channel allocation of one or more data packet types to change during the period when dynamically revised QoS ranking 416 is to be effective.

Figure 5:
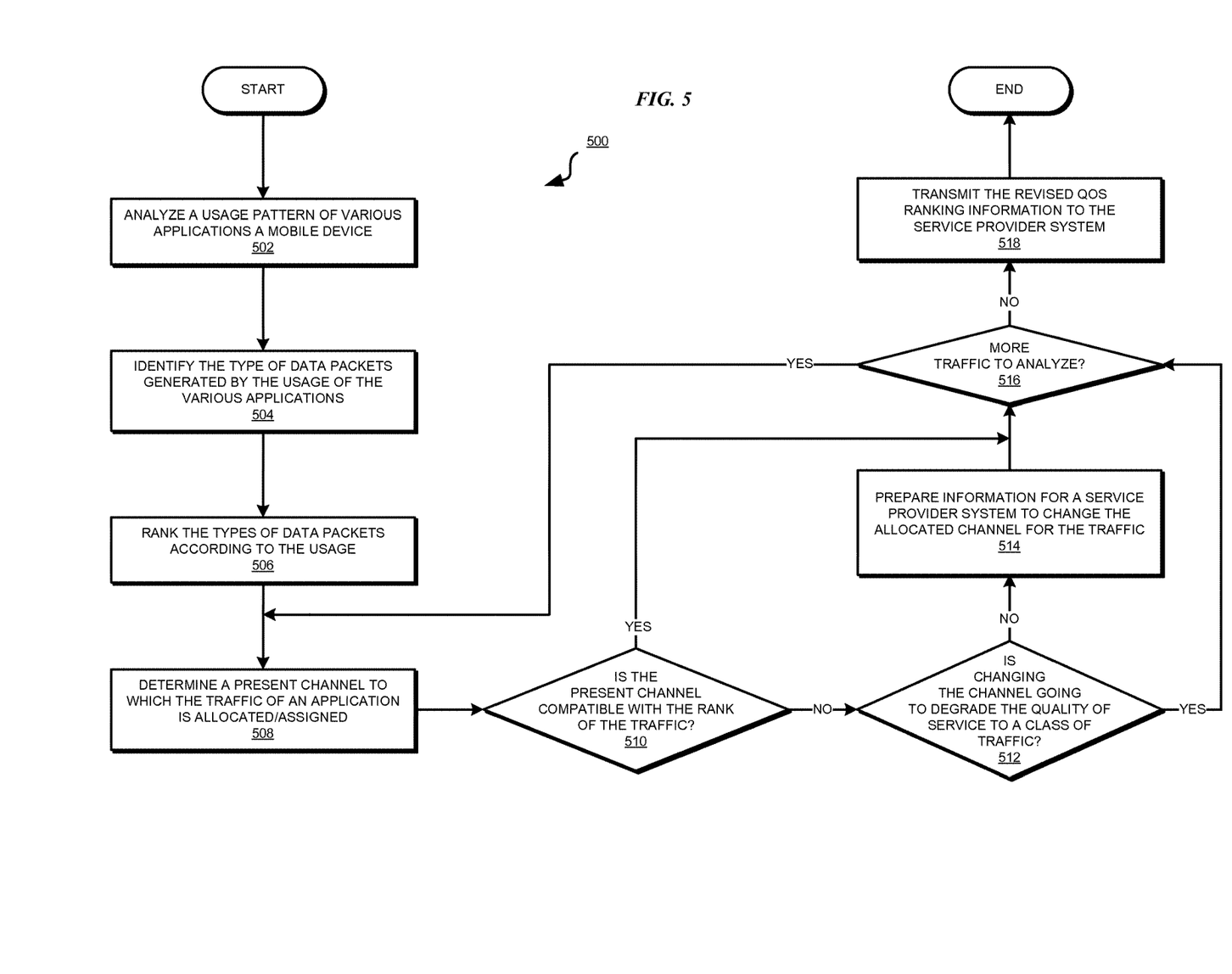
FIG. 5 depicts a flowchart of an example process for dynamic quality of service adjustment using device-side analytics in accordance with an illustrative embodiment.

With reference to FIG. 5, this figure depicts a flowchart of an example process for dynamic quality of service adjustment using device-side analytics in accordance with an illustrative embodiment. Process 500 can be implemented in application 402 in FIG. 4.

The application analyzes a usage pattern of one or more applications in a UE, e.g., in mobile device 304 in FIG. 3 (block 502). The application identifies one or more types of data packets generated by the usage (block 504). The application ranks the various types of data packets according to the QoS expected for the corresponding usage (block 506).

The application identifies a present data communication channel, e.g., a default bearer channel or a dedicated bearer channel, to which the traffic of data packets of a particular type is allocated or assigned (block 508). The application determines whether the present channel is compatible with, or suitable for, the rank associated with the type (block 510). If the channel is suitable ("Yes" path of block 510), the application proceeds to block 516. If the presently assigned channel is not suitable ("No" path of block 510), the application determines whether changing the channel is going to cause a degradation of the QoS of a class of services, e.g., a primary service (block 512). One embodiment uses a threshold QoS to form the determination of block 512.

If changing the channel for the packet of the type is going to degrade the QoS of a service of the class considered in block 512 ("Yes" path of block 512), the application proceeds to block 516. If not, the application prepares information for a service provider system to change the allocated channel to the traffic of the packet type (block 514).

The application determines if the data traffic of more packet types is to be analyzed in this manner (block 516). If more traffic is to be analyzed ("Yes" path of block 516), the application returns to block 508 and selects another type and determine the channel allocation for the type. If no more traffic is to be analyzed ("No" path of block 516), the application transmits the revised QoS ranking information to the service provider system (block 518). The application ends process 500 thereafter.

Thus, a computer implemented method, system or apparatus, and computer program product are provided in the illustrative embodiments for dynamic quality of service adjustment using device-side analytics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dynamic quality of service (QoS) adjustment using device-side analytics, the method comprising:
    analyzing, using a processor on a mobile device, a usage pattern, the usage pattern comprising information indicative of an expected use of a first application during a period;
    determining a ranking of each of a plurality of types of data packets according to an expected QoS based upon the usage pattern;
    determining, using the processor on the mobile device, a first QoS desired for the first application during the period over a wireless network;
    identifying, from a plurality of data communication channels, a first data communication channel presently assigned to a first type of data packets of the plurality of types of data packets, the first type of data packets being used by the first application;
    creating, by the mobile device, a profile including the usage pattern and a ranking of the first type of data packets relative to a second type of data packets of the plurality of types of data packets;
    determining that the presently assigned first data communication channel is unsuitable to provide the first QoS;
    adjusting, responsive to a current usage pattern being dissimilar to the usage pattern of the profile, the ranking of the first type of data packets relative to the second type of data packets of the plurality of types of data packets to assign a new rank to the first type of data packets;
    determining, using the processor on the mobile device, that the new rank has changed from the ranking of the first type of data packets by more than a threshold amount;
    updating the profile with the current usage pattern and the new rank; and
    transmitting, by the mobile device responsive to determining that the new rank has changed from the ranking of the first type of data packets by more than the threshold amount, the new rank to a service provider system associated with the wireless network, the new rank causing the service provider system to assign the first type of data packets to a second data communication channel in the plurality of data communication channels.

2. The method of claim 1, wherein the first data communication channel comprises a default bearer channel and the second data communication channel comprises a dedicated bearer channel, and wherein the default bearer channel and the dedicated bearer channel are provisioned to the mobile device by the service provider of the wireless network.

3. The method of claim 1, wherein the first data communication channel comprises a default bearer channel and the second data communication channel comprises a first dedicated bearer channel selected from a plurality of dedicated bearer channels, wherein the default bearer channel and the plurality of dedicated bearer channels are provisioned to the mobile device by the service provider of the wireless network, wherein the first dedicated bearer channel is selected responsive to the first dedicated bearer channel having a greater available capacity during the period compared to a second dedicated bearer channel in the plurality of dedicated bearer channels during the period.

4. The method of claim 1, further comprising:
    determining that the second data communication channel is suitable to provide the first QoS, wherein the first QoS is an improvement over a second QoS, the previously assigned data communication channel when used for the first type providing the second QoS.

5. The method of claim 1, wherein the service provider of the wireless network assigns the presently assigned data communication channel to the first type.

6. The method of claim 1, wherein the presently assigned data communication channel is assigned to the first type responsive to a previous QoS ranking sent from the mobile device to the service provider of the wireless network.

7. The method of claim 1, wherein the period is a future period, and wherein the first application will be executed on the mobile device during the period.

8. The method of claim 1, wherein the method is embodied in a computer program product comprising one or more computer-readable tangible storage devices and computer-readable program instructions which are stored on the one or more computer-readable tangible storage devices and executed by one or more processors.

9. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

10. A computer program product for dynamic quality of service (QoS) adjustment using device-side analytics, the computer program product comprising:
one or more computer-readable tangible storage devices;
program instructions, stored on at least one or more storage devices, to analyze, using a processor on a mobile device, a usage pattern, the usage pattern comprising information indicative of an expected use of a first application during a period;
program instructions, stored on at least one or more storage devices, to determine a ranking of each of a plurality of types of data packets according to an expected QoS based upon the usage pattern;
program instructions, stored on at least one of the one or more storage devices, to determine, using the processor on the mobile device, a first QoS desired for a first application during the period over a wireless network;
program instructions, stored on at least one of the one or more storage devices, to identify, from a plurality of data communication channels, a first data communication channel presently assigned to a first type of data packets of the plurality of types of data packets, the first type of data packets being used by the first application;
program instructions, stored on at least one of the one or more storage devices, to create, by the mobile device, a profile including the usage pattern and a ranking of the first type of data packets relative to a second type of data packets of the plurality of types of data packets;
program instructions, stored on at least one of the one or more storage devices, to determine that the presently assigned first data communication channel is unsuitable to provide the first QoS;
program instructions, stored on at least one of the one or more storage devices, to adjust, responsive to a current usage pattern being dissimilar to the usage pattern of the profile, the ranking of the first type of data packets relative to the second type of data packets of the plurality of types of data packets to assign a new rank to the first type of data packets;
program instructions, stored on at least one of the one or more storage devices, to determine, using the processor on the mobile device, that the new rank has changed from the ranking of the first type of data packets by more than a threshold amount;
program instructions, stored on at least one of the one or more storage devices, to update the profile with the current usage pattern and the new rank; and
program instructions, stored on at least one of the one or more storage devices, to transmit, by the mobile device responsive to determining that the new rank has changed from the ranking of the first type of data packets by more than the threshold amount, the new rank to a service provider system associated with the wireless network, the new rank causing the service provider system to assign the first type of data packets to a second data communication channel in the plurality of data communication channels.

11. The computer program product of claim 10, wherein the first data communication channel comprises a default bearer channel and the second data communication channel comprises a dedicated bearer channel, and wherein the default bearer channel and the dedicated bearer channel are provisioned to the mobile device by the service provider of the wireless network.

12. The computer program product of claim 10, wherein the first data communication channel comprises a default bearer channel and the second data communication channel comprises a first dedicated bearer channel selected from a plurality of dedicated bearer channels, wherein the default bearer channel and the plurality of dedicated bearer channels are provisioned to the mobile device by the service provider of the wireless network, wherein the first dedicated bearer channel is selected responsive to the first dedicated bearer channel having a greater available capacity during the period compared to a second dedicated bearer channel in the plurality of dedicated bearer channels during the period.

13. The computer program product of claim 10, further comprising:
program instructions, stored on at least one of the one or more storage devices, to determine that the second data communication channel is suitable to provide the first QoS, wherein the first QoS is an improvement over a second QoS, the previously assigned data communication channel when used for the first type providing the second QoS.

14. The computer program product of claim 10, wherein the service provider of the wireless network assigns the presently assigned data communication channel to the first type.

15. The computer program product of claim 10, wherein the presently assigned data communication channel is assigned to the first type responsive to a previous QoS ranking sent from the mobile device to the service provider of the wireless network.

16. The computer program product of claim 10, wherein the period is a future period, and wherein the first application will be executed on the mobile device during the period.

17. A computer system for dynamic quality of service (QoS) adjustment using device-side analytics, the computer system comprising:
one or more processors, one or more computer-readable memories and one or more computer-readable tangible storage devices;
program instructions, stored on at least one or more storage devices, to analyze, using a processor on a mobile device, a usage pattern, the usage pattern comprising information indicative of an expected use of a first application during a period;
program instructions, stored on at least one or more storage devices, to determine a ranking of each of a plurality of types of data packets according to an expected QoS based upon the usage pattern;
program instructions, stored on at least one of the one or more storage devices for execution by at least one of the one or more processors via at least one of the one or more memories, to determine, using the processor on the mobile device, a first QoS desired for a first application during the period over a wireless network;
program instructions, stored on at least one of the one or more storage devices for execution by at least one of the one or more processors via at least one of the one or more memories, to identify, from a plurality of data communication channels, a first data communication channel presently assigned to a first type of data packets, the first type of data packets being used by the first application;
program instructions, stored on at least one of the one or more storage devices for execution by at least one or the one or more processors via at least one of the one or more memories, to create, by the mobile device, a profile including the usage pattern and a ranking of the first type of data packets relative to a second type of data packets of the plurality of types of data packets;

program instructions, stored on at least one of the one or more storage devices for execution by at least one of the one or more processors via at least one of the one or more memories, to determine that the presently assigned first data communication channel is unsuitable to provide the first QoS;

program instructions, stored on at least one of the one or more storage devices for execution by at least one of the one or more processors via at least one of the one or more memories, to adjust, responsive to a current usage pattern being dissimilar to the usage pattern of the profile, the ranking of the first type of data packets relative to the second type of data packets to assign a new rank to the first type of data packets;

program instructions, stored on at least one of the one or more storage devices, to determine, using the processor on the mobile device, that the new rank has changed from the ranking of the first type of data packets by more than a threshold amount;

program instructions, stored on at least one of the one or more storage devices for execution by at least one or the one or more processors via at least one of the one or more memories, to update the profile with the current usage pattern and the new rank; and program instructions, stored on at least one of the one or more storage devices for execution by at least one of the one or more processors via at least one of the one or more memories, to transmit, by the mobile device responsive to determining that the new rank has changed from the ranking of the first type of data packets by more than the threshold amount, the new rank to a service provider system associated with the wireless network, the new rank causing the service provider system to assign the first type of data packets to a second data communication channel in the plurality of data communication channels.

18. The computer system of claim 17, wherein the first data communication channel comprises a default bearer channel and the second data communication channel comprises a dedicated bearer channel, and wherein the default bearer channel and the dedicated bearer channel are provisioned to the mobile device by the service provider of the wireless network.

* * * * *